(No Model.)
W. S. PLATT.
ELECTRODE FOR SECONDARY BATTERIES.
No. 273,598. Patented Mar. 6, 1883.
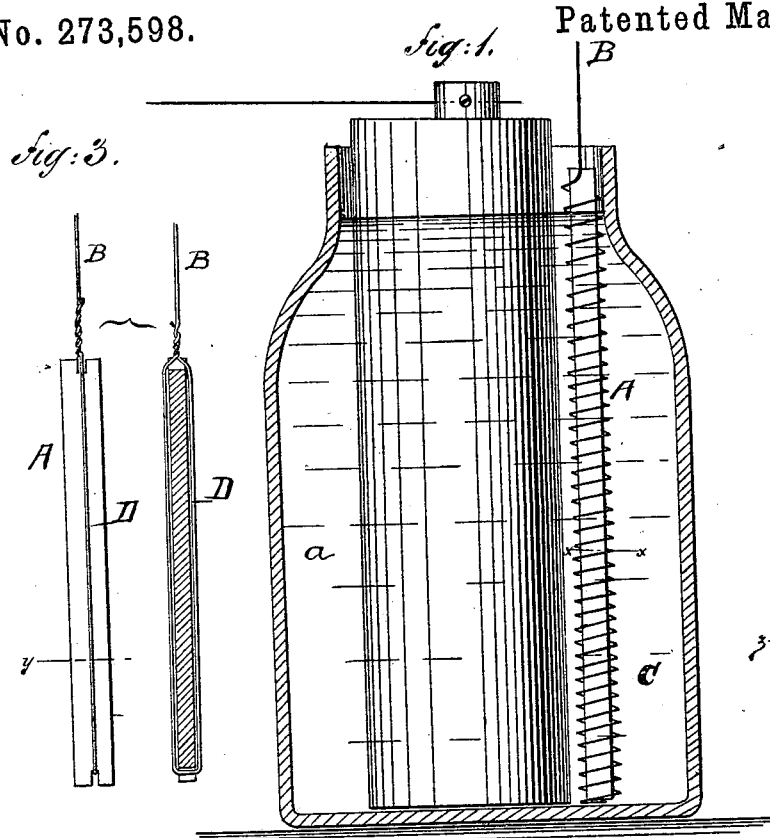
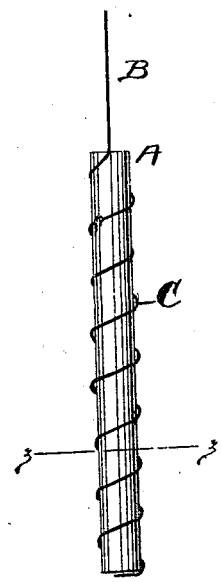
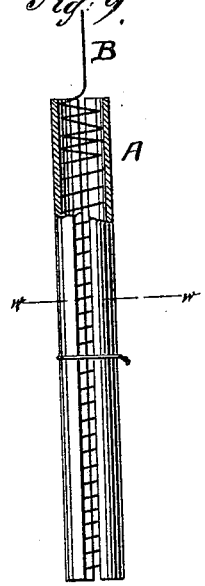
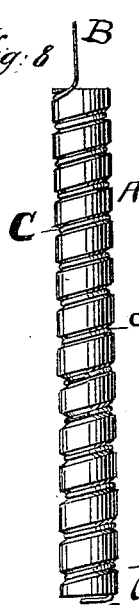
WITNESSES:
Chas. Nida
Jno. N. Bruns.
INVENTOR
William S. Platt.
BY
ATTORNEY

UNITED STATES PATENT OFFICE.

WILLIAM S. PLATT, OF WATERBURY, CONNECTICUT.

ELECTRODE FOR SECONDARY BATTERIES.

SPECIFICATION forming part of Letters Patent No. 273,598, dated March 6, 1883.

Application filed November 10, 1882. (No model.)

*To all whom it may concern:*

Be it known that I, WILLIAM S. PLATT, of Waterbury, county of New Haven, State of Connecticut, have invented a new and useful Improvement in Electrodes for Galvanic Batteries; and I do hereby declare the following to be a full, clear, and exact description of the same, reference being had to the accompanying sheet of drawings, forming part of this specification.

This invention is in the nature of an improvement in electrodes for galvanic batteries; and the invention consists in an electrode combined with a current-wire continued into a coil or loop extending from one end of the electrode to the other, the coil or loop, as well as the electrode, being immersed in the fluid of the battery, for the purpose more particularly described hereinafter.

In the accompanying sheet of drawings, Figure 1 is a longitudinal section of a Leclanché cell with my electrode, &c., in position; Fig. 2, a cross-section of electrode and coil, taken in line $x$ $x$, Fig. 1. Fig. 3 represents an electrode suspended by a loop; Fig. 4, a cross-section taken in the line $y$ $y$, Fig. 3. Fig. 5 is a modification of my coil and electrode, as are also Figs. 6, 9, and 8, and cross-sections 7 and 10.

Similar letters of reference indicate like parts in the several figures.

As is well known, the positive electrodes of galvanic batteries, particularly those of the Leclanché battery, are unequally corroded by the fluid of the battery. Besides, when that portion of the electrode which is immersed in the fluid becomes corroded, so as to be no longer useful, it is customary to throw away such an electrode and substitute a new one, notwithstanding the upper part, amounting generally to about one-half the length of the electrode, remains uncorroded and intact. Now, to remedy these several objections, as well as others found to exist in the common electrode, I construct my electrode A of any suitable size and shape and either of common zinc or a zinc and mercury amalgam—preferably the latter, however—and instead of attaching the current-wire B to the upper end of the electrode, as is done with the ordinary electrode, I prolong the wire into a coil, C, or a loop, D, within which coil or loop, as the case may be, the electrode is placed. These loops or coils should be of sufficient length to practically extend from one end of the electrode to the other, so that the coils or loops may be wholly or substantially wholly in the fluid $a$ of the battery, as well as the electrode. The upper ends of these coils or loops are continued in the ordinary circuit-wire.

When the electrode is inserted within the coil or loop B and the coil and the electrode are immersed in the fluid solution of the battery—for instance, the solution of sal-ammoniac and water, as is used in the Leclanché battery—and the circuit is closed by the use of the battery for telephonic or other purposes, the zinc at once commences to corrode, as is usual, but by my invention more uniformly than heretofore; and when the battery is not in use or the circuit broken a coating of zinc is deposited on the coil or loop, rendering it substantially an electrode in itself, thereby adding to the effect of the electrode proper, for when the battery is again used or the circuit established this zinc coating is attacked precisely as is the electrode proper. This combination of the electrode and circuit-wire, continued into a coil or loop, insures a perfect metallic contact between the electrode and a circuit-wire, and it permits the ready reversing of the electrode within the solution, so that when the portion of the electrode within the fluid has become practically consumed by corrosion the upper part of the electrode, or that part of it which was not in the fluid, can be inserted in the coil or loop, when it at once becomes, to all intents and purposes, a new electrode, the result being an obvious saving. In making this change or reversal of the electrode the connection between the electrode and the circuit-wire is instantly established without the employment of binding-screws, the contact of the electrode within the coil or loop being amply sufficient. As a matter of fact, when the coil as above described is employed, instead of being one continuous bar of zinc the electrode may consist of several pieces or sections of zinc, the surrounding coil establishing a complete metallic contact, and sufficient unity for all practical electric purposes.

The best results are obtained, in the construction of my coil or loop and electrode, by first amalgamating the coil or loop B, for by such treatment the copper or brass wire composing the coil or loop is with more certainty electroplated with the zinc deposit. In some cases, however, instead of amalgamating the coil or loop, it may, before it is inserted in the battery, be coated with zinc by the ordinary process, in which case the plating is renewed as rapidly as it is taken off by the action of the battery and the electroplating process hereinbefore described when referring to the amalgamated coil.

Instead of using the ordinary coil or loop B, as described, a spiral groove, c, may be formed in the surface of the electrode A, and the wire of the coil be received within this groove, as is shown in Figs. 5 and 6; or the electrode may be formed in the shape of a hollow tube, and the terminating coil be inserted within the tube, as is shown in Fig. 9. In fact, many other forms for terminating the circuit-wire may be employed in connection with the electrode without departing from the spirit of my invention.

From the foregoing it will be seen that by my invention the current from the battery is not only more uniform in its character, but it acts with greater certainty and vigor.

Having now described my invention, what I claim as new, and desire to secure by Letters Patent, is—

1. A galvanic battery with its electrode placed within a coil or loop formed from the end of the circuit-wire and making part of the same, said coil or loop, as well as the electrode, being submerged in the fluid of the battery, substantially as shown and described.

2. In a galvanic battery, one of the circuit-wires thereof terminating in an amalgamated coil or loop, in combination with an electrode, substantially as shown and described.

3. In a galvanic battery, a coil or loop formed from the lower termination of one of the circuit-wires, coated with zinc and containing the positive electrode and submerged in the fluid of the battery, substantially as shown and described.

4. In a galvanic battery, the positive electrode thereof, consisting of a tube, and receiving within the same a terminal coil of a circuit-wire.

5. A coil or loop formed from the lower termination of the circuit-wire, in combination with an amalgamated electrode received within said coil or loop and submerged in the fluid of the battery, as and for the purpose described.

WM. S. PLATT.

Witnesses:
H. B. FIELD,
D. F. WEBSTER.